Dec. 21, 1943.    B. B. LOWE    2,337,481
DEEP FAT FRYING KETTLE
Filed Dec. 29, 1941    3 Sheets-Sheet 1

BIRDELL B. LOWE,
INVENTOR.

BY Donald E. Windle
ATTORNEY.

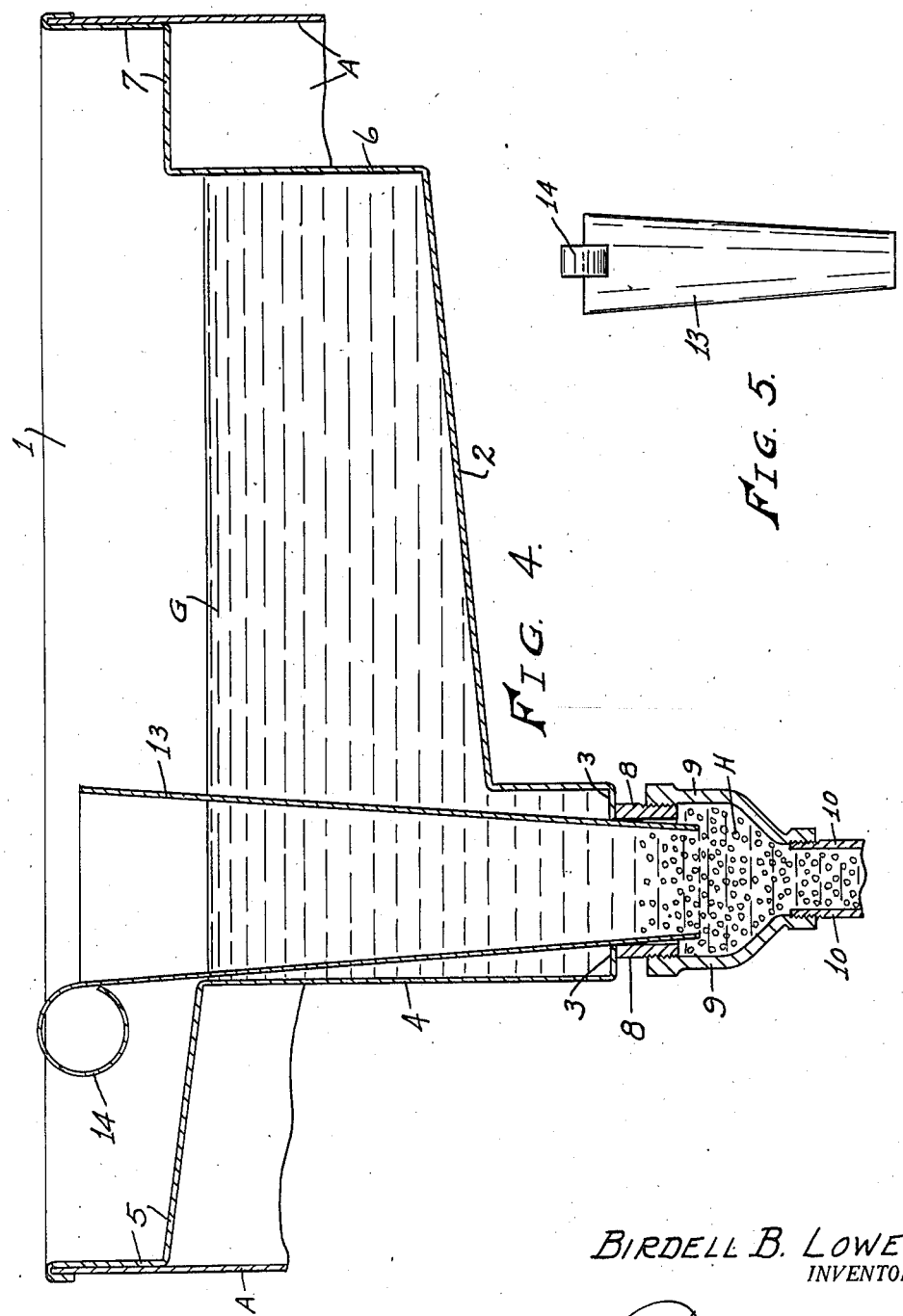

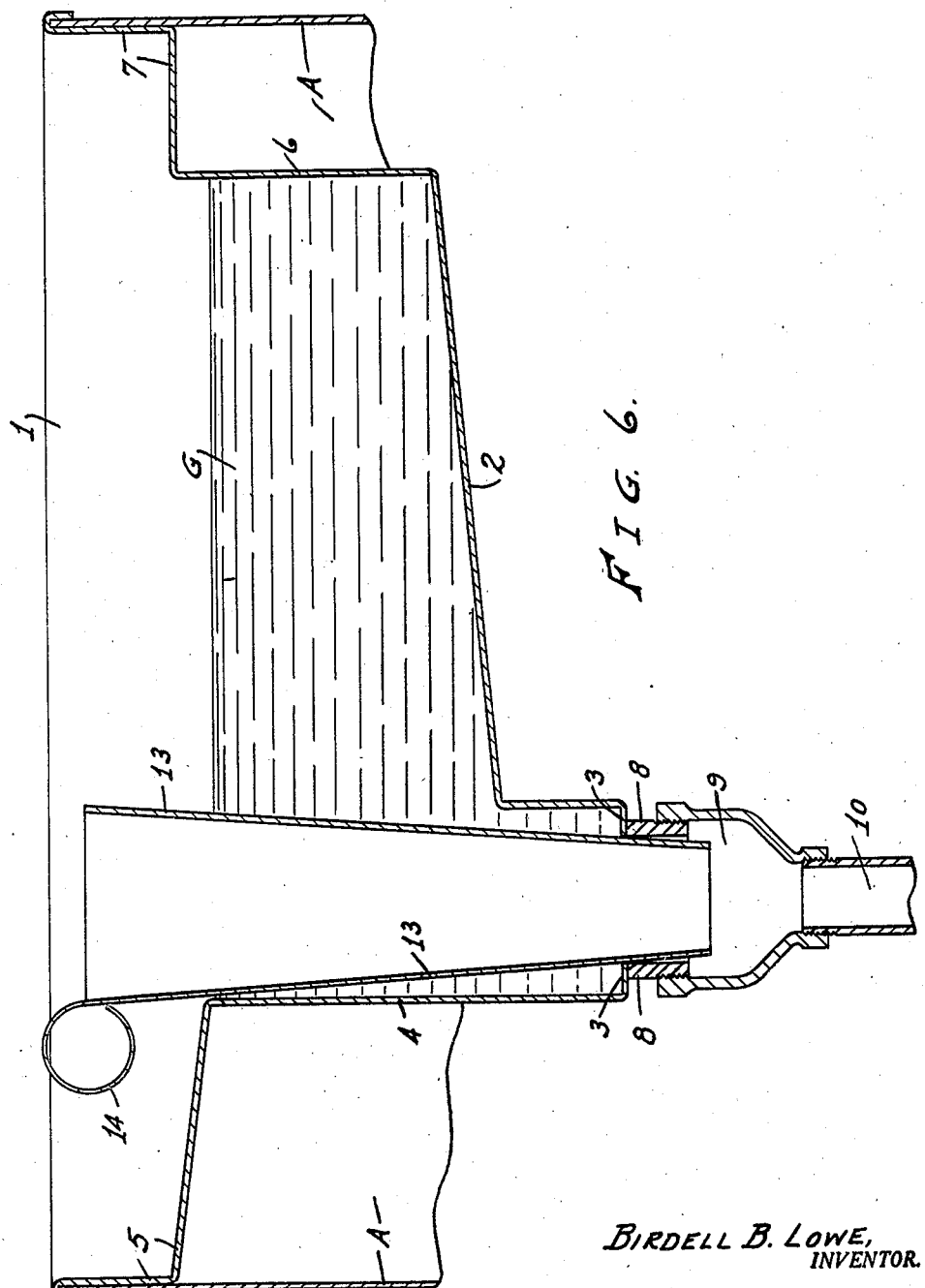

Patented Dec. 21, 1943

2,337,481

UNITED STATES PATENT OFFICE 2,337,481

DEEP FAT FRYING KETTLE

Birdell B. Lowe, Richmond, Ind.

Application December 29, 1941, Serial No. 424,711

3 Claims. (Cl. 99—408)

My present invention relates to the construction of kettles used in the culinary art for frying and preparing foods in deep fat. I am fully aware that kettles for the purpose are old in the art, but previous kettles lack facilities for easy cleaning, it being necessary to frequently drain the entire contents thereof in order to rid the kettles of settlings which accumulate in the bottoms thereof.

The principal object of the invention is the provision of a deep fat frying kettle which is easily cleaned of settlings at frequent intervals with minimum effort and time consumed and without loss of heat from the fats contained therein.

A second object of the invention is the provision of a kettle constructed in such manner as to present an unobstructed bottom surface readily adaptable to removal of settlings therefrom without substantial loss of heated fats contained therein.

A third object of the invention is the provision of a kettle having a sloping bottom with a trough being formed along and adjacent one side thereof, with the trough providing a space removed from direct radiation of the heating element used in heating the fats contained within the kettle.

A fourth object of the invention is the provision of a kettle having a bottom formed therein with the bottom sloping downwardly toward one side and with a trough being formed adjacent the lowermost portion of the bottom, and with the trough having an aperture formed therein communicating with a drain, and with a valve located in the drain and providing means for draining all or only a portion of the fats from the kettle.

A fifth object of the invention is the provision of a kettle having a sloping bottom formed therein with the bottom sloping downwardly toward one side thereof and with a trough being formed adjacent the lowermost portion of the bottom with the slope of the bottom encouraging the movement of settlings toward and into the trough by gravity.

A further object of the invention is the provision of a separate and removable tubular member to be inserted in the upper portion of the drain whereby the heated fats contained within the kettle, except that portion filling the tubular member, will be restrained against entrance into the drain.

A still further object of the invention is the provision of a deep fat frying kettle which is simple of construction, which is easy of access for cleaning, which is readily adaptable to various suitable types of heating elements, and which is economical to manufacture and operate.

Other objects and advantages of the invention will suggest themselves in the course of the following description, and that which is new will be pointed out in the appended claims.

The most satisfactory means for carrying out the principles of the invention in a practical and efficient manner is shown in the accompanying three sheets of drawings, in which:

Figure 3 illustrates an electrical heating element and controls therefor with which the kettle may be equipped.

Figure 4 is a longitudinal detail section through the kettle similar to Figure 3 but with details of the heating element and the controls therefor being omitted therefrom. Figure 4 further illustrates the kettle as containing fats used for frying, and shows settlings collected in the drain pipe and with the tubular member being shown in position prior to drainage of the settlings from the kettle.

Figure 5 is an elevational detail of the tubular member.

Figure 6 is a longitudinal detail section through the kettle similar to Figure 4 but with the settlings having been drained therefrom.

Like characters designate like parts throughout the several views.

Figure 1:
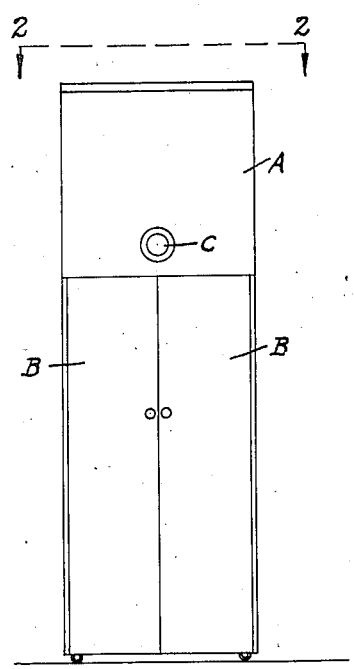
Figure 1 is a front elevation of a cabinet in which the invention is embodied.
Figure 2:
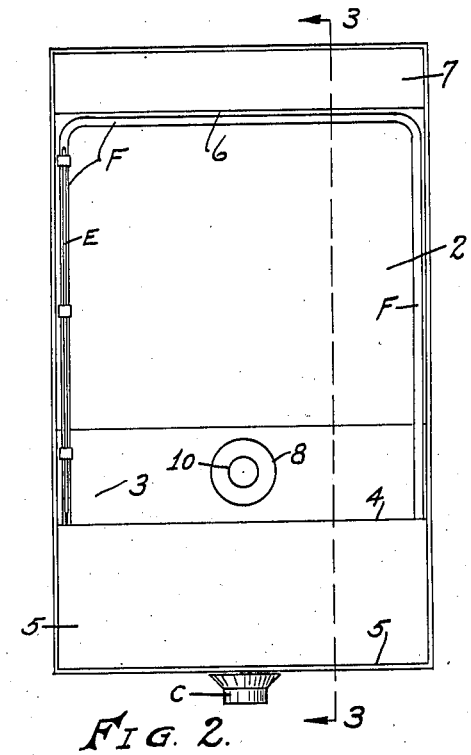
Figure 2 is a top plan view of the cabinet taken from line 2—2 of Figure 1 and showing a top plan view of the frying kettle.
Figure 3:
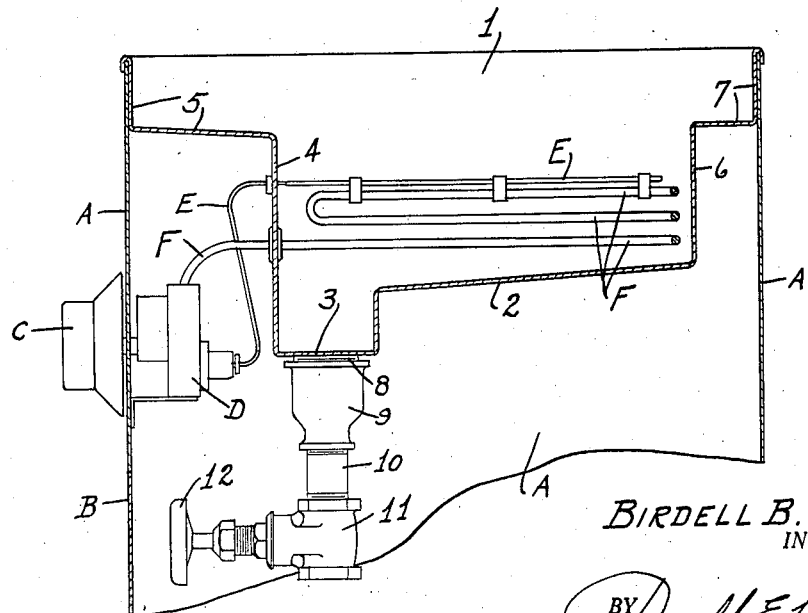
Figure 3 is a longitudinal detail section through the upper portion of the cabinet and the frying kettle, taken on line 3—3 of Figure 2. In addition to showing the kettle.

In illustrating the details of the invention, I have shown an electrical heating element and thermostatic control therefor as a means of providing the necessary heat energy to the fats contained within the kettle. It is to be understood that heating elements other than electrical may be used with equal succcess in connection with the kettle. However, in the use of other types of heating elements, it is obviously necessary to locate the same outside the kettle with the heat therefrom being directed against the sides and bottom of the kettle.

Referring now to the drawings in detail, A designates a cabinet which is used to enclose the kettle and which may be of any desirable and suitable form. B designates doors providing access to the lower portion of the cabinet and to the space beneath the kettle, and more especially to the valve located in the drain pipe. C designates a knob adjustably controlling the electrical switch and the thermostatic unit E of the heating element F.

The kettle is preferably formed of sheet metal welded or formed into a single unit, or the same may be formed by the casting process.

In the drawings, the kettle is shown as having side members 1, with the portion therebetween being designated by the numerals 2 to 7 inclusive. 2 designates the bottom of the kettle which slopes downwardly from the rear portion toward the front, with the depressed portion 3 forming a trough forwardly of the bottom 2 and extending between the sides 1. The front wall 4 extends upwardly from the forward side of the trough 3 with the portions 5 forming a space known to the art as "foam space." 6 designates a rear wall extending upwardly from the bottom 2 and with a rear "foam space" being formed by the portions 7.

A downwardly-extending externally threaded member 8 is formed as a part of the trough 3 and is connected with the member 9. The member 9 is connected, at the lower end thereof, to the pipe 10. A valve 11 is connected to the lower end of the pipe 10, with the opening and closing action of the valve 11 being adjustably controlled by means of the wheel 12. The members 9, 10, and 11 form the drainage members.

A suitable receptacle (not shown) may be placed beneath the valve for catching material drained from the kettle.

In the operation of the kettle, the same is filled to the proper level with suitable fats G which are melted and maintained at the proper temperature by means of the heating elements. Foods are placed in open mesh wire baskets (not shown) and are immersed in the heated fats. In the cooking or frying process, small particles of food are loosened from the main portion thereof and settle to the bottom of the kettle. The settlings, upon contact with the sloping bottom 2, have a tendency to roll or drift toward the lowermost portion thereof and into the trough 3. The settlings which may accumulate on the surface of the bottom 2 may be moved into the trough by means of an ordinary scraper, after which they may be directed along the trough and into the drain by the same means. After the settlings have been collected in the drain, the tubular member 13 is inserted into the drain thereby closing the communication between the kettle and the drain. After the member 13 is positioned as shown in Figure 4, the valve 11 is opened by means of the wheel 12, and the settlings, together with the fat confined within the member 13 are drained into a suitable receptacle, leaving the drain and the member 13 empty of contents as indicated in Figure 6. After drainage of the settlings has been effected, the valve 11 is closed and the member 13 is removed by means of the handle portion 14.

It is obvious that only a small portion of the contents of the kettle are removed in the process of draining the settlings and that heat is retained in the remaining fats. The cooking or frying operation is interrupted only for the short interval of time required to insert the member 13 and to drain the contents thereof. After the settlings have been drained and the member 13 removed, fresh fats may be added to bring the contents of the kettle to the proper level.

It is well known in the art that settlings, if retained in the kettle for unusually long periods, cause discoloration of the fats within the kettle and consequently produces foods of inferior and undesirable quality. Conventional kettles are not provided with troughs or satisfactory equivalents therefor whereby settlings may collect in a space remote from direct radiation from the heating elements. The trough as illustrated provides a comparatively cool zone in the kettle where settlings may collect, but which does not provide sufficient heat to cause discoloration by over-cooking. In order to properly clean the conventional kettles, it is necessary to drain the entire contents therefrom, with the result that cooking operations must be suspended for a comparatively long period of time. The arrangement as illustrated, provides for substantially continuous operation, and without the loss of heat from the contents of the kettle.

It is to be understood that minor changes may be made in the several parts and in the details herein shown and described, insofar as the changes may fall within the scope of the appended claims.

Having now fully shown and described the invention, what I claim and desire to secure by Letters Patent of the United States is:

1. In combination with a deep fat frying kettle having a drain formed in the bottom thereof, a removable tubular member adapted to be inserted in the drain and extending upwardly therefrom and excluding the remainder of the contents of the kettle from the drain except those confined within the tubular member.

2. In combination with a deep fat frying kettle having a drain formed in the bottom and adjacent one side thereof, a removable tubular member adapted to be inserted in the drain and extending upwardly therefrom and excluding the remainder of the contents of the kettle from the drain while in place except those confined within the tubular member, and upon removal therefrom permitting the remainder of the contents of the kettle to occupy the space occupied by the tubular member.

3. A deep fat fryer comprising a plurality of sides forming a kettle, a bottom sloping from one side to an opposite side with a trough being formed in the lowermost portion of the bottom and located longitudinally adjacent one of the sides, a drain formed in the lower portion of the trough with a valve being located in the drain member, a tubular member adapted to set into the drain and permitting the contents of the kettle confined within the tubular member to be drained through the drain pipe without the remainder of the contents of the kettle being disturbed or drained therefrom.

BIRDELL B. LOWE.